United States Patent
Ho et al.

(10) Patent No.: US 8,319,746 B1
(45) Date of Patent: Nov. 27, 2012

(54) SYSTEMS AND METHODS FOR REMOVING ELECTRICAL NOISE FROM A TOUCHPAD SIGNAL

(75) Inventors: Harvey Ho, Mountain View, CA (US); Adrian Wong, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/188,968

(22) Filed: Jul. 22, 2011

(51) Int. Cl.
*G06F 3/041* (2006.01)
*G09G 5/00* (2006.01)

(52) U.S. Cl. ........................................ 345/173; 345/156

(58) Field of Classification Search .......... 345/156–184, 345/1.1–9; 178/18.01–20.04
See application file for complete search history.

(56) References Cited

U.S. PATENT DOCUMENTS

| | | | |
|---|---|---|---|
| 4,686,332 A * | 8/1987 | Greanias et al. ............... | 345/173 |
| 4,918,262 A | 4/1990 | Flowers et al. | |
| 5,488,204 A | 1/1996 | Mead et al. | |
| 6,259,436 B1 * | 7/2001 | Moon et al. .................... | 345/173 |
| 6,750,852 B2 | 6/2004 | Gillespie et al. | |
| 7,126,583 B1 | 10/2006 | Breed | |
| 7,157,649 B2 | 1/2007 | Hill | |
| 7,176,902 B2 | 2/2007 | Peterson, Jr. et al. | |
| 7,196,694 B2 | 3/2007 | Roberts | |
| 7,277,087 B2 | 10/2007 | Hill et al. | |
| 7,292,227 B2 | 11/2007 | Fukumoto et al. | |
| 7,411,581 B2 | 8/2008 | Hardie-Bick | |
| 7,411,584 B2 | 8/2008 | Hill et al. | |
| 7,495,659 B2 * | 2/2009 | Marriott et al. ............... | 345/173 |
| 7,499,039 B2 | 3/2009 | Roberts | |
| 7,515,138 B2 * | 4/2009 | Sullivan ........................ | 345/173 |
| 7,643,011 B2 | 1/2010 | O'Conner | |
| 7,667,694 B2 | 2/2010 | Takahashi et al. | |
| 7,683,890 B2 | 3/2010 | Geaghan | |
| 7,746,325 B2 | 6/2010 | Roberts | |
| 7,944,435 B2 | 5/2011 | Rosenberg et al. | |
| 2002/0135570 A1 * | 9/2002 | Iisaka et al. ................... | 345/177 |
| 2006/0071912 A1 * | 4/2006 | Hill et al. ....................... | 345/173 |
| 2006/0262104 A1 * | 11/2006 | Sullivan et al. ................ | 345/177 |
| 2008/0289887 A1 * | 11/2008 | Flint et al. .................... | 178/18.03 |
| 2009/0088204 A1 | 4/2009 | Culbert | |
| 2009/0231282 A1 * | 9/2009 | Fyke ............................. | 345/169 |
| 2009/0265670 A1 | 10/2009 | Kim | |

(Continued)

FOREIGN PATENT DOCUMENTS

EP 0818751 1/1998

(Continued)

*Primary Examiner* — Alexander Eisen
*Assistant Examiner* — Patrick F Marinelli
(74) *Attorney, Agent, or Firm* — McDonnell Boehnen Hulbert & Berghoff LLP

(57) ABSTRACT

Systems and methods for removing electrical noise from an input signal from a touchpad device are provided. The touchpad device and one or more sensors may be coupled to a frame. Mechanical vibrations resulting from contact with a surface of the touchpad device during a motion input to the touchpad device may propagate via the frame to the one or more sensors. Information from the input signal and mechanical vibration signals received by one or more sensors may be processed to remove the electric noise from the input signal. In one example, information associated with relative motion of the input may be determined based on varying intensities of mechanical vibration signals received from the one or more sensors. Information of the input signal and the information associated with the relative motion may be correlated to determine position and/or movement information associated with the motion input.

20 Claims, 9 Drawing Sheets

U.S. PATENT DOCUMENTS

| | | | |
|---|---|---|---|
| 2009/0273583 A1* | 11/2009 | Norhammar | 345/177 |
| 2010/0007474 A1 | 1/2010 | Behm | |
| 2010/0060604 A1 | 3/2010 | Zwart et al. | |
| 2010/0110368 A1* | 5/2010 | Chaum | 351/158 |
| 2010/0149073 A1 | 6/2010 | Chaum et al. | |
| 2010/0225601 A1* | 9/2010 | Homma et al. | 345/173 |
| 2010/0299642 A1 | 11/2010 | Merrell et al. | |
| 2011/0012840 A1* | 1/2011 | Hotelling et al. | 345/173 |
| 2011/0018825 A1* | 1/2011 | Kondo et al. | 345/173 |
| 2011/0025480 A1 | 2/2011 | Hwang | |
| 2011/0037734 A1 | 2/2011 | Pance et al. | |
| 2011/0063228 A1* | 3/2011 | St. Pierre et al. | 345/173 |
| 2011/0084914 A1 | 4/2011 | Zalewski | |
| 2011/0096036 A1 | 4/2011 | McIntosh et al. | |
| 2011/0096037 A1 | 4/2011 | Virzi | |
| 2011/0115729 A1 | 5/2011 | Kremin et al. | |
| 2011/0141052 A1 | 6/2011 | Bernstein et al. | |
| 2011/0141066 A1* | 6/2011 | Shimotani et al. | 345/177 |
| 2011/0157052 A1 | 6/2011 | Lee | |
| 2011/0267263 A1 | 11/2011 | Hinckley | |

FOREIGN PATENT DOCUMENTS

| | | |
|---|---|---|
| EP | 1798635 A1 * | 6/2007 |
| EP | 2270636 | 1/2011 |
| EP | 2284658 | 2/2011 |
| WO | WO 2011/050113 | 4/2011 |

* cited by examiner

SYSTEMS AND METHODS FOR REMOVING ELECTRICAL NOISE FROM A TOUCHPAD SIGNAL

FIELD

This disclosure relates to touchpad devices, and in examples, to sensors used by a touchpad device to characterize inputs received by the touchpad device.

BACKGROUND

Touchpads make use of capacitive sensing, conductive sensing, or other technologies to map an input received by a touchpad to movement of a cursor, for example. A user can interact with a touchpad by sliding a finger along a touch-sensitive surface to control a cursor on a display. Additionally, some touchpads include the ability to sense and interpret tapping motions or other movement gestures indicating execution of a function by a computing device coupled to the touchpad.

A common method of operating touchpads involves sensing capacitance levels of a two-dimensional grid array of capacitors. A high frequency signal is applied to two layers of parallel lines, crossing each other at rights angles, and separated by an insulator forming the grid array of capacitors. Objects near intersections of the grid create changes in capacitance at the intersections, which are processed to determine position and movement information.

SUMMARY

This disclosure may disclose, inter alia, devices and methods for removing electrical noise from an input signal from a touchpad device. Information from the input signal and mechanical vibration signals received by one or more sensors may be processed to remove the electric noise from the input signal.

In one example, a method for removing electrical noise is provided. In the method, an input signal may be received from a touchpad device coupled to a frame. The input signal may indicate a motion input to a surface of the touchpad device. The method includes, but is not limited to, receiving from one or more sensors coupled to the frame one or more mechanical vibration signals. The mechanical vibration signals may result from a contact with the surface of the touchpad device during the motion. One or more mechanical vibrations may propagate from the contact with the surface to the one or more sensors via the frame. Additionally, the method includes determining information associated with relative motion of the input to the surface of the touchpad device based on varying intensities of the one or more mechanical vibration signals. The method further includes processing information of the input signal and the information associated with the relative motion to remove electrical noise from the input signal. State information associated with the motion input to the surface of the touchpad device may be estimated based on a correlation of the information of the input signal and the information associated with the relative motion. Moreover, one of position and movement information associated with the motion input to the surface of the touchpad device may be determined based on the state information.

In another example, a non-transitory computer-readable medium with instructions stored thereon is provided. The instructions may be executable by a computing device to perform functions. The instructions may be executable for receiving an input signal, from a touchpad device coupled to a frame, indicating a motion input to a surface of the touchpad device. The instructions may be further executable for receiving, from one or more sensors coupled to the frame, one or more mechanical vibration signals. The mechanical vibration signals may result from a contact with the surface of the touchpad device during the motion. One or more mechanical vibrations may propagate from the contact with the surface to the one or more sensors via the frame. Additionally, the instructions may be executable for determining information associated with relative motion of the input to the surface of the touchpad device based on varying intensities of the one or more mechanical vibration signals. According to the instructions, information of the input signal and the information associated with the relative motion may be processed to remove electrical noise from the input signal. State information associated with the motion input to the surface of the touchpad device may be estimated based on a correlation of the information of the input signal and the information associated with the relative motion. Moreover, one of position and movement information associated with the motion input to the surface of the touchpad device may be determined based on the state information.

In another example, a system is provided. The system includes a memory and a processor coupled to the memory. The system may further include instructions stored in the memory and executable by the processor to perform functions. The instructions may be executable for receiving an input signal, from a touchpad device coupled to a frame, indicating a motion input to a surface of the touchpad device. The instructions may be further executable for receiving, from one or more sensors coupled to the frame, one or more mechanical vibration signals. The mechanical vibration signals may result from a contact with the surface of the touchpad device during the motion. One or more mechanical vibrations may propagate from the contact with the surface to the one or more sensors via the frame. Additionally, the instructions may be executable for determining information associated with relative motion of the input to the surface of the touchpad device based on varying intensities of the one or more mechanical vibration signals. According to the instructions, information of the input signal and the information associated with the relative motion may be processed to remove electrical noise from the input signal. State information associated with the motion input to the surface of the touchpad device may be estimated based on a correlation of the information of the input signal and the information associated with the relative motion. Moreover, one of position and movement information associated with the motion input to the surface of the touchpad device may be determined based on the state information.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
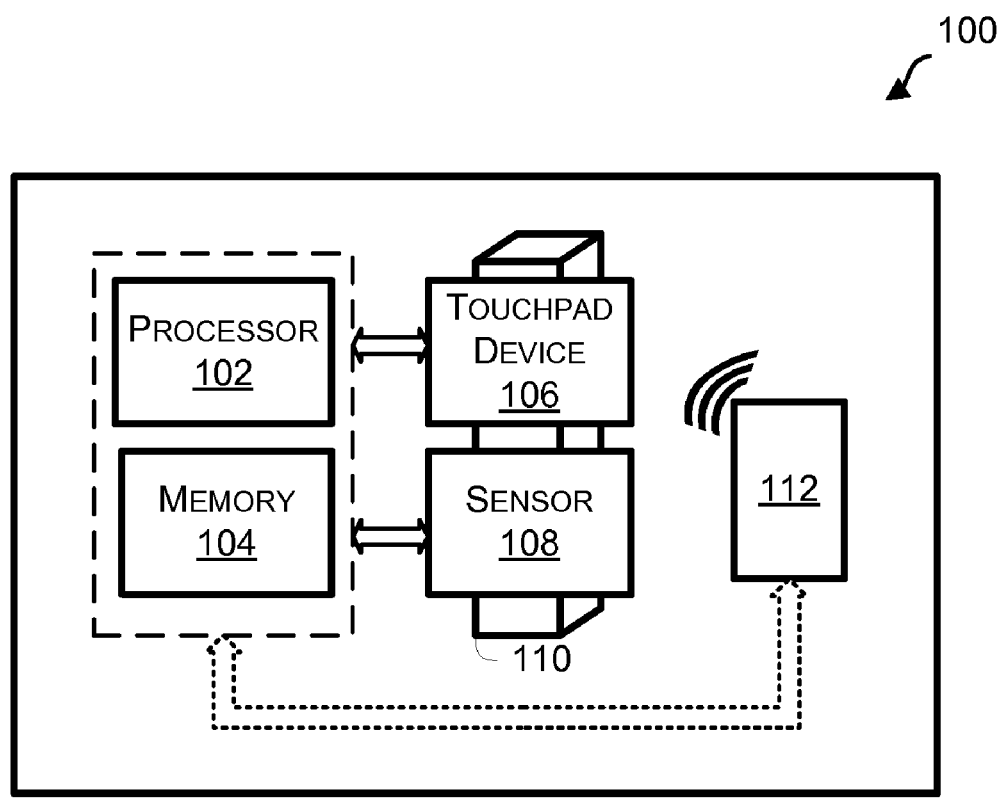
FIG. 1 illustrates an example system.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, devices and methods for removing or filtering out electrical noise. The devices and methods may be directed to receiving an input signal from a touchpad device coupled to a frame. The input signal may indicate a motion input to a surface of the touchpad device. The motion input to the surface of the touchpad device may create mechanical vibrations resulting from a contact with the surface. In some examples, the mechanical vibrations may propagate via the frame to one more sensors coupled to the frame. Sensor fusion of information of the input signal and information received by the sensors may be used to remove electrical noise from the input signal.

Information associated with relative motion of the input to the surface of the touchpad device may be determined based on varying intensities of the mechanical vibration signals received from the sensors. Information of the input signal and the information associated with the relative motion may be processed to remove electrical noise from the input signal. For example, state information associated with the motion input to the surface of the touchpad device may be estimated. The state information may be estimated based on a correlation of the information of the input signal and the information associated with the relative motion. Based on the state information, position and/or movement information associated with the motion input to the surface of the touchpad device may be determined.

In some examples, the touchpad device may be operated in a noisy electrical environment. For example, the touchpad device may be operated in close proximity to radio communication noise and/or noise radiating from circuitry or other hardware. In addition, the touchpad device may be exposed to an integrated circuit of a computing device producing electromagnetic interference. In some examples, there may be no shielding between the touchpad device and a noise source, such that input signals of the touchpad may include or be subject to electrical noise. In a further example, system heat from a processor (or any source) may cause temperature gradients which may increase the effects of electrical noise. Information from a motion input to a surface of the touchpad device may be lost, negatively affected, or masked by the electrical noise.

In one example, the one or more sensors may be an accelerometer or microphone configured to determine location or movement information associated with contact with the surface of the touchpad device. The one or more sensors may be coupled to the frame in a known position relative to the surface of the touchpad device. Any combination of accelerometers and microphones operated in close proximity to the touchpad device may be able to detect minor vibrations as contact with the surface of the touchpad occurs (e.g., a finger dragging across the surface indicating a sliding motion).

In another example, information of the input signal and mechanical vibrations may be matched to a plurality of predetermined input signals and mechanical vibration signals associated with position and/or movement information. According to the disclosure, various sensor fusion algorithms may be employed to compensate for electrical noise within the input signal of the touchpad device.

Referring now to the figures, FIG. 1 illustrates an example system 100. The system 100 may include a processor 102 coupled to a memory 104. Additionally the system 100 may include a touchpad device 106 and one or more sensors 108 coupled to a frame 110, and an electrical noise source 112, all of which may be coupled to the processor 102 and the memory 104.

The processor 102 may be any type of processor, such as a microprocessor, digital signal processor (DSP), multicore processor, etc., coupled to the memory 104. The memory 104 may be any type of memory, such as volatile memory like random access memory (RAM), dynamic random access memory (DRAM), static random access memory (SRAM), or non-volatile memory like read-only memory (ROM), flash memory, magnetic or optical disks, or compact-disc read-only memory (CD-ROM), among other devices used to store data or programs on a temporary or permanent basis.

The system 100 may receive inputs to a surface or sensing region of the touchpad device 106. The touchpad device 106 may sense at least one of a position and a movement of a finger or other pointing device via capacitive sensing, resistance sensing, or a surface acoustic wave (SAW) process, among other possibilities. For example, the touchpad device 106 may be capable of sensing finger movement in a direction parallel or planar to the surface, in a direction normal to the surface, or both, and may also be capable of sensing a level of pressure applied to the surface. In one example, the touchpad device 106 may be formed of one or more translucent or transparent insulating layers and one or more translucent or transparent conducting layers.

In the example of a capacitive sensing touchpad, one or more insulating layers may be coated with one or more conducting layers, and a driving signal may be applied to at least one of the one or more conducting layers. Different capacitive technologies may be used to determine the location of contact with the surface. For example, in a surface capacitance method, only one side of an insulating layer is coated with a conductive layer. A small voltage may be applied to the conductive layer, resulting in an electrostatic field. When a user's finger touches the surface, a capacitor is dynamically formed, and the touchpad device 106 may determine the location of the touch indirectly from the change in capacitance. Alternatively, a mutual capacitance method may be used to determine touch locations at a plurality of locations (e.g., multi-touch). In the example of resistive sensing, contact with the surface creates a change in an electrical current between two thin, electrically conductive layers separate by a narrow gap at the point of contact. In the example of a SAW process, contact with the surface creates a change in an ultrasonic wave passing over the surface.

In one example, the touchpad device 106 may be capable of also sensing interaction within a volume of space near the surface. The touchpad device 106 may include proximity sensors, depth cameras capable of optionally tracking fingers and limbs of a user or other objects, depth sensors, theremins, magnetic sensors tracking a handheld magnetic object, among other types of sensors. Capacitive sensing may also allow for proximity detection. In one example, a capacitive based sensor may enable the touchpad device 106 to detect interaction within a volume of space with or without contact with the surface. For example, the touchpad device 106 may detect when a user's finger or other object is near a surface of the touchpad device 106 and also identify an exact or substantially exact position within the volume of space.

In one example, portions of the surface may be formed to have a raised, indented, or roughened surface, so as to provide tactile feedback to a user when the user's finger reaches the edge of the surface. In another example, the touchpad device 106 may recognize gestures or specific finger actions input to the surface and/or within the volume of space.

In some examples, the system 100 may also include a display (not shown) coupled to or included within the system 100 and/or the touchpad device 106. For example, the display may be a liquid-crystal display (LCD), a holographic display, or configured to project a display on a surface, among other types of displays. The display may include any number of pixels, producing any quality of resolution. The display may also be a three-dimensional display composed of voxels. The touchpad device 106 may be used to control movement of a cursor viewable on the display. The cursor may be an indicator used to show a position on the display that may respond to input from the touchpad device 106. In one example, the cursor may be in a traditional shape of an arrow pointing up and to the left. In other examples, the cursor may be depicted as any number of other shapes. The cursor may also change shape depending on circumstances of the system 100, or leave a vanishing trail on the display indicating the movement of the cursor.

Although the touchpad device 106 may be described with respect to controlling movement of a cursor, the description is not meant to be limiting. Other alternatives exist for which the methods and systems described may also apply. The touchpad device 106 may be used to move a slider or push two-dimensional or three-dimensional objects around on a display. For example, a user may be able to pop bubbles or bump balloons on the display with their finger using the touchpad device 106. In other examples, the touchpad device 106 may be used to control scrolling of a webpage or map, panning or zooming of an image or document, etc., among other possibilities.

In one example, the touchpad device 106 may be a pointing device which translates motion of a finger on the surface of the touchpad device 106 into motions of a cursor on a display. The touchpad device 106 may interpret gestures or finger actions on the surface as special commands instead of motions intended to control the cursor. For example, the special commands may trigger functions that are performed in response to the gestures.

In one example, the touchpad device 106 may be separate from a display. Alternatively, in an instance in which the display is a touch-screen display, functions of the touchpad device 106 may be combined into the display.

The one or more sensors 108 may be or include a device capable of measuring a physical quantity (e.g., a mechanical vibration) and converting the physical quantity into a signal. For example, the one or more sensors 108 may be a microphone configured to convert sound into an electrical signal. The microphone may use a variety of acoustic-to-electric transducing methods such as electromagnetic induction, capacitance change, piezoelectric generation, or light modulation, among other possibilities to produce an electrical voltage signal from a mechanical vibration. The microphone may be unidirectional, bidirectional, omnidirectional, or capable of sensing mechanical vibrations in any other combination of directions. Additionally, the microphone may have any possible phase and frequency response characteristics. Moreover, the one or more sensors may be a microphone array.

In another example, the one or more sensors may be an accelerometer capable of measuring proper acceleration (i.e., physical measurable acceleration experienced by the accelerometer). The accelerometer may be a single-axis or multi-axis model capable of detecting magnitude and direction information. Piezoelectric, piezoresistive, and capacitive components may be used to convert the mechanical motion into an electrical signal. In one example, the accelerometer may be a micro electro-mechanical system (MEMS) including a cantilever beam.

In a further example, the one or more sensors may be a temperature sensor capable of measuring temperature (or temperature gradients) of a surface, area, or volume of space. For example, one, or any combination of, a temperature gauge, thermocouple, thermistor, resistance temperature detector (RTD), silicon bandgap temperature sensor, or other type of sensors may be used.

The touchpad device 106 and one or more sensors 108 may both be coupled to a common frame 110 or housing. The one or more sensors 108 may be connected mechanically to the frame 110 along with the touchpad device 106. The frame 110 may be composed of any material through which mechanical vibrations may propagate. In one example, the sensor 108 may be coupled to a circuit board of the touchpad device 106.

In some examples, the electrical noise source 112 may be any source providing an unwanted perturbation to a wanted signal. For example, the electrical noise source 112 may interfere with or unduly influence an input signal generated by the touchpad device 106. The electrical noise source 112 may be internal to the system 100 or optionally external to the system 100. In some examples, the system 100 may be susceptible to multiple electrical noise sources.

In one example, the electrical noise source 112 may be a component from within the system 100. For example, the electrical noise source 112 may be a main central processing unit (CPU) clock signal, a memory signal, a processor, an integrated circuit, a radio communication module, a display, etc. In another example, the electrical noise source 112 may be an external noise source such as a cellular phone operated in close proximity, wired communication or wireless radio communication systems, interference from a power line, or any other source of electromagnetic interference or electrical noise.

Figure 2:
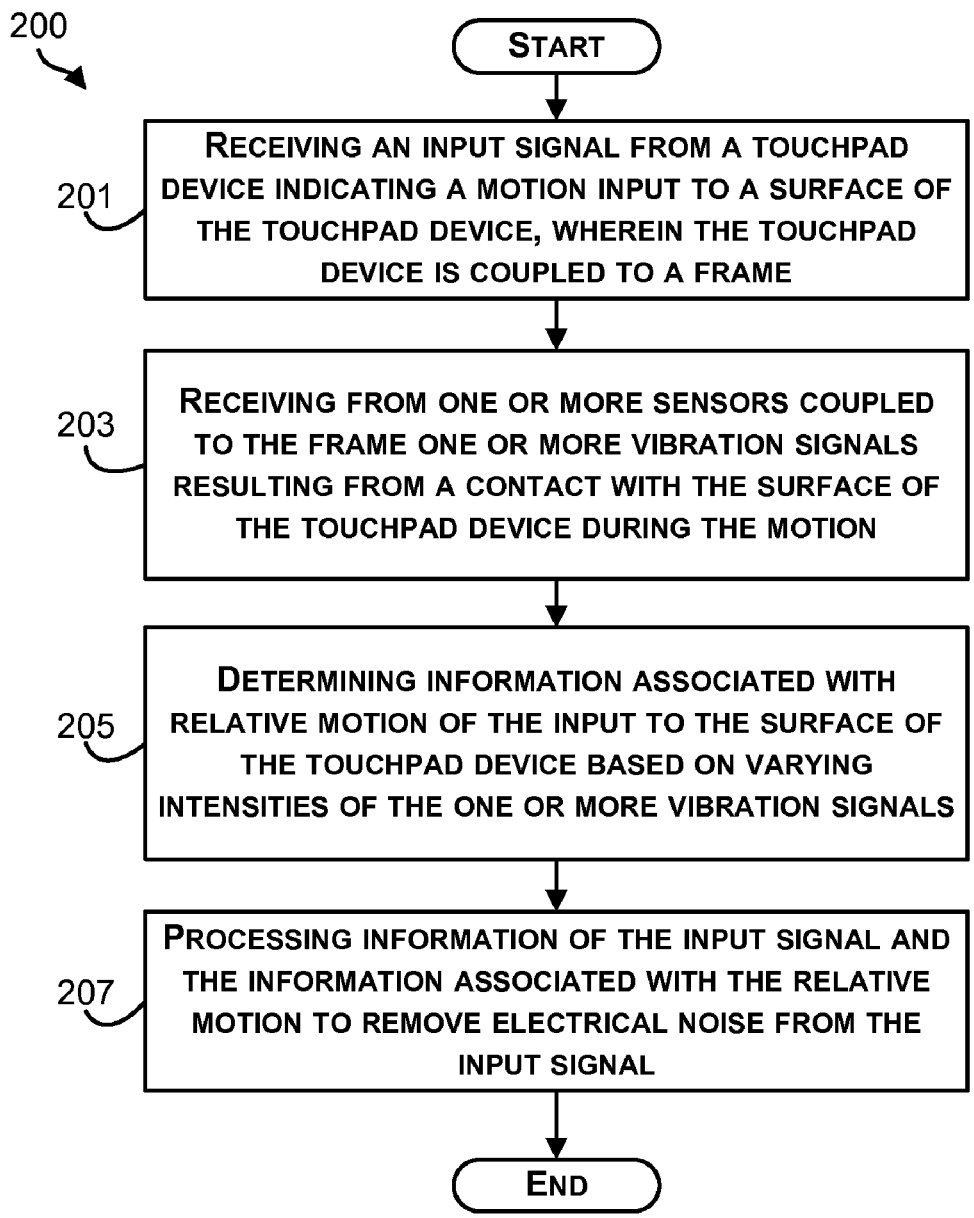
FIG. 2 is an example block diagram of a method to remove electrical noise, in accordance with at least some embodiments described herein.

FIG. 2 is an example block diagram of a method 200 to remove electric noise, in accordance with at least some embodiments described herein. The method 200 shown in FIG. 2 presents an embodiment of a method that may, for example, be used by the system 100 of FIG. 1. Method 200 may include one or more operations, functions, or actions as illustrated by one or more of blocks 201-207. Although the blocks are illustrated in a sequential order, these blocks may also be performed in parallel, and/or in a different order than those described herein. Also, the various blocks may be combined into fewer blocks, divided into additional blocks, and/or removed from the method, based upon the desired implementation of the method.

In addition, for the method 200 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and random access memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 200 and other processes and methods disclosed herein, each block in FIG. 2 may represent circuitry that is wired to perform the specific logical functions in the process.

Initially, at block 201, the method 200 includes receiving an input signal from a touchpad device indicating a motion input to a surface of the touchpad device, wherein the touchpad device is coupled to a frame. The input signal may be an indication of position and/or movement information within the surface. The motion input to the surface may be, for example, a tap, or multiple taps, on a position of the surface or a sliding motion across the surface of the touchpad device. Additionally, the motion may be in a direction parallel or planar to the surface, in a direction normal to the surface, or both. In one example, the motion input to the surface may indicate a position or movement of more than one input simultaneously. For example, the motion input to the surface may indicate two positions or movements based on contact of two fingers with the surface.

In one example, the input signal may be determined in an absolute mode. For example, in the absolute mode, the input signal may include information identifying a location within the surface of the touchpad device at which an input is received. In one example, in the absolute mode, the touchpad device reports the absolute position of where a finger makes contact with the surface of the touchpad device. The absolute position of the finger may be measured absolutely with respect to a coordinate system. In one example, the origin of a two-dimensional coordinate system (i.e., x-y axis), parallel to the surface of the touchpad device, is located in the lower-left corner of a square surface of the touchpad device. Therefore, the touchpad device may report the absolute coordinates of a position.

In another example, the input signal may be determined in a relative mode. In the relative mode, movement within the surface of the touchpad device may be received in relative amounts of motion in component directions with respect to a fixed coordinate system. Component directions may be established relative to a two-dimensional or three-dimensional (i.e., x-y-z axis) coordinate system parallel and/or perpendicular to the surface of the touchpad device. For example, a change in the position of a finger relative to the finger's previous position on the surface of the touchpad device may be reported.

At block 203, the method 200 includes receiving from one or more sensors coupled to the frame one or more vibration signals resulting from a contact with the surface of the touchpad device during the motion. One or more auditory or mechanical vibrations may propagate from the contact with the surface to the one or more sensors via the frame.

In one example, the one or more sensors may include a microphone coupled to a known position on the frame. Relative motion of the motion input to the surface of the touchpad device may be determined based on varying intensities of a mechanical vibration signal from the microphone. Moreover, the one or more sensors may include a second microphone coupled to a second known position on the frame. Two-dimensional position and movement of the motion input to the surface of the touchpad device may be determined based on outputs from the microphone and the second microphone.

In another example, the one or more sensors may include an accelerometer coupled to a known position on the frame. Relative motion of the motion input to the surface may be determined based on varying intensities of a mechanical vibration signal from the accelerometer.

In one example, the contact with the surface may include a sliding motion across the surface. Also, the contact with the surface may include a gesture on the surface. Gestures recognized may be tapping gestures, sliding motion gestures, or a combination of both. In one example, a gesture may be pinching two fingers together within the sensing region of a touchpad device. In another example, a gesture may be rotating two fingers within the surface of the touchpad device, or making a spiral motion with one finger.

In one example, brief contact with the surface of the touchpad device, where a finger may touch the surface and then break contact with the surface, with little or no motion in a direction parallel to the surface of the touchpad device may be identified as a tap. For example, the absolute position of contact may be determined with reference to a two-dimensional coordinate system of the touchpad surface. The touchpad device may sense contact in a direction normal to the surface of the touchpad device (i.e., z axis), at a depth greater than a threshold at one instance, but vanishing after a very short time period. During the contact, there may also be little or no motion in directions parallel to the surface of the touchpad device (i.e., x-y axis). In another example, the touchpad device may identify two successive contacts with the surface of the touchpad device. The successive taps may happen within a duration of time. In one example, this may be similar to the double-click method commonly input using a mouse.

In one example, the one or more sensors may receive or be subject to the one or more mechanical vibrations. Also, the one or more sensors may output the one or more mechanical vibration signals indicative of the contact with the surface of the touchpad device during the motion input to the surface.

At block 205, the method 200 includes determining information associated with relative motion of the input to the surface of the touchpad device based on varying intensities of the one or more vibration signals. Information from the one or more sensors may be used to determine relative motion of contact with the touchpad device. For example, a microphone may be able to determine a gesture of the motion input to the surface or distinguish the motion input among one or more potential classifications of gestures. The position of the microphone may be fixed and known relative to the surface of the touchpad device. A linear motion on the surface progressing away from the microphone may sound different (or produce a different sound signal) than a circle gesture on the surface. The linear motion may produce a mechanical vibration decaying over time in a known fashion (e.g., linear, exponential, etc.). Meanwhile, the circle gesture may produce a mechanical vibration with an intensity dropping initially, but later increasing. Additionally, the use of a second microphone (or other type of sensor) in a known position may afford a more accurate determination of two-dimensional movements.

Similarly, an accelerometer coupled to the frame with which the touchpad device is coupled may be used to determine information associated with relative motion of the input to the surface of the touchpad device. The accelerometer may vibrate in response to the mechanical vibrations propagating to the accelerometer and produce a mechanical vibration signal indicative of the contact with the surface. The accelerometer may be able to provide information associated with mechanical vibrations in a three-dimensional frame of motion.

At block 207, the method 200 includes processing information of the input signal and the information associated with the relative motion to remove electrical noise from the input signal. The processing may include estimating state information associated with the motion input to the surface of the touchpad device based on a correlation of the information of the input signal and the information associated with the relative motion. The processing may also include determining one of position and movement information associated with the motion input to the surface of the touchpad device based on the state information. Additionally, the method 200 may include accessing a database to determine whether the state information is associated with a known gesture.

In one example, the state information associated with the motion input to the surface of the touchpad device may be indicative of one of position and movement information associated with an ideal input signal received from the touchpad device based on the motion. The ideal input signal may include substantially no electrical noise.

In one example, estimating state information associated with the motion input to the surface of the touchpad device may include one or more of: matching information of the input signal with the information associated with relative motion based on the one or more mechanical vibration signals received at substantially the same time as the motion input to the surface of the touchpad device; removing a portion of the input signal from the information of the input signal where the variation of the information of the input signal with respect to the information associated with relative motion is above a tolerance, so as to provide a filtered input signal; and determining state information associated with the motion input to the surface based on the filtered input signal.

In another example, estimating state information associated with the motion input to the surface of the touchpad device may include: determining a first uncertainty value of the information of the input signal; determining a second uncertainty value of the information associated with the relative motion; processing information of the input signal and information associated with the relative motion using a weighted average; and determining state information associated with the motion input to the surface of the touchpad device based on the weighted average. The first uncertainty value and second uncertainty value may be or include covariance values associated with one or more relationships between information of the input signal and information associated with the relative motion. Alternatively, the first uncertainty value and second uncertainty value may be predetermined values, or determined using a separate algorithm or lookup table. Additionally, the first uncertainty value may be associated with a weight of the information of the input signal. Similarly, the second uncertainty value may be associated with a weight of the information associated with the relative motion.

In one example, information of the input signal from the touchpad device may indicate contact with the touchpad surface (e.g., a finger tap) even when a finger is not in the vicinity of the touchpad surface. The determined information associated with relative motion may indicate that no movement or contact with the surface occurred because no (or a small amount of) auditory or mechanical vibration signals propagated to the one or more sensors via the frame when the input signal indicated contact occurred. Processing the information of the input signal and information associated with relative motion may be used to prevent a false positive output of the contact (i.e., indicating a tap occurred when no contact with the surface was made). The fusion of information of the one or more sensors and input signal may be useful in preventing false positive outputs in cases of severe electrical noise, for example.

The method 200 may be applicable to operation of a touchpad device in a noisy electrical environment. For example, an electrical circuit of the touchpad device (e.g., an array of capacitive sensors) may be disturbed by electromagnetic interference resulting in electrical noise within the input signal from the touchpad device. In one example, the electrical circuit of the touchpad device may be exposed to an integrated circuit of a computing device that provides electromagnetic interference. There may be no or little shielding, or layer of conductive material, between the electrical circuit of the touchpad device. In one example, the integrated circuit and the electrical circuit may be in close proximity within a housing or package that does not present space for shielding between the electrical circuit and the integrated circuit.

In a further example, the method 200 may include receiving from one or more sensors (optionally coupled to the frame) a temperature signal. The method 200 may further include processing information of the input signal, the information associated with relative motion, and information associated with the temperature signal to remove electrical noise from the input signal.

Figure 3A:
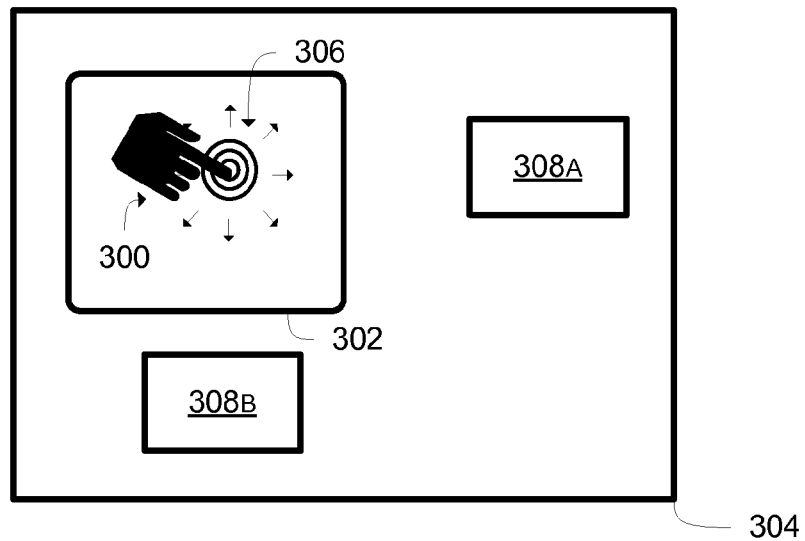
FIG. 3A illustrates an example of receiving mechanical vibration signals.

FIG. 3A illustrates an example of receiving mechanical vibration signals. A contact 300 with a surface of a touchpad device 302 coupled to a frame 304 may occur during a motion input to the surface. The contact 300 may include any combination of a tap, gesture, sliding or dragging motion, or other interaction with the surface creating a mechanical vibration 306. The mechanical vibration 306 may propagate along or via the frame 304 in multiple directions. One or more sensors 308a, 308b may also be coupled to the frame 304. The one or more sensors 308a, 308b may receive the mechanical vibration 306 and generate one or more mechanical vibration signals indicative of the mechanical vibration.

Figure 3B:
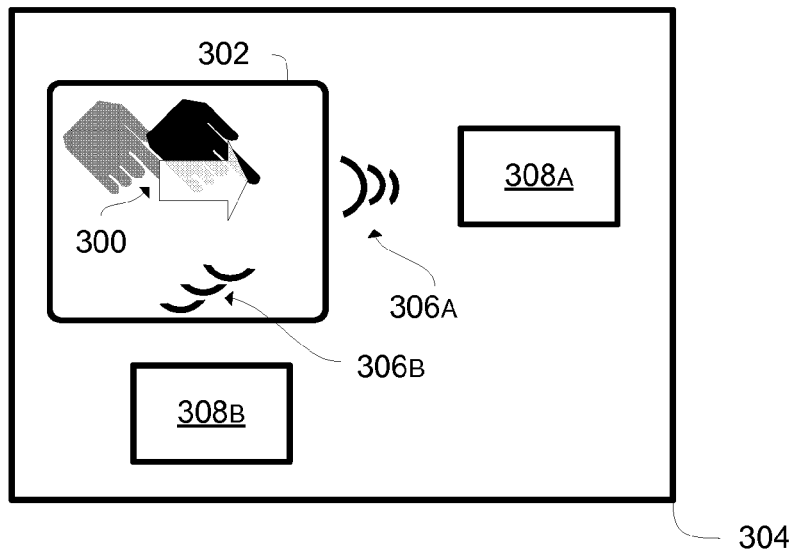
FIG. 3B illustrates an example of determining information associated with relative motion.

FIG. 3B illustrates an example of determining information associated with relative motion. Contact 300 (e.g., a user dragging a finger) with a surface of the touchpad device 302 may occur during a motion input to the surface. The contact 300 may generate mechanical vibrations 306a, 306b with varying intensities over time propagating towards the one or more sensors 308a, 308b respectively. Mechanical vibration signals received from the one or more sensors 308a, 308b in response to the mechanical vibrations may be used to determine information associated with relative and/or absolute position or movement of the contact 300 during the motion.

For example, the mechanical vibration 306a may have an intensity increasing in a linear fashion over time. A mechanical vibration signal output by the sensor 308a in response to the mechanical vibration 306a may be interpreted to determine a component of the motion input to the surface may include a sliding motion in a direction towards the sensor 308a. Applying similar logic to the mechanical vibration 306b and sensor 308b, a determination may be made that a second component of the motion input may include a small or negligible change in a direction towards the sensor 308b. In one example, determining information associated with relative motion of the input to the surface of the touchpad device based on varying intensities of the one or more mechanical vibration signals may include accessing a database to associate the varying intensities of the one or more mechanical vibration signals with a known motion.

Although the intensities of the mechanical vibration signals output by the sensors 308a, 308b may be used to determine information associated relative or absolute motion of the contact 300, other characteristics of the mechanical vibration signals may also be used. For example, the one or more sensors 308a, 308b may sense and output information associated with a phase, frequency, pattern, trend, or other characteristic of the mechanical vibrations 306a, 306b propagating via the frame 304.

Figure 4:
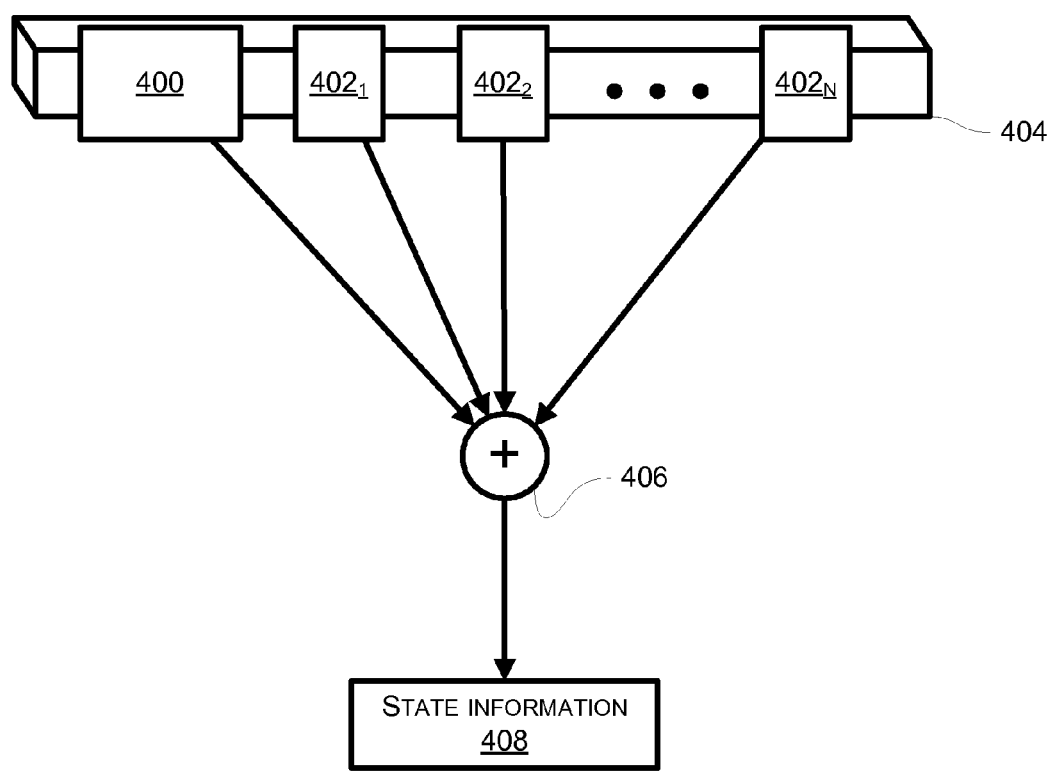
FIG. 4 illustrates an example flow diagram of estimating state information associated with a motion input to a surface of a touchpad device.

FIG. 4 illustrates an example flow diagram of estimating state information 408 associated with a motion input to a surface of a touchpad device 400. The touchpad device 400 and one or more sensors $402_1, 402_2, \ldots 402_n$ may be coupled to a frame 404. Information of an input signal from the touchpad device 400 and the one or more sensors $402_1, 402_2, \ldots 402_n$ may be combined or processed at a module 406 to estimate state information 408.

Although the one or more sensors $402_1, 402_2, \ldots 402_n$ are illustrated in a linear arrangement, the one or more sensors $402_1, 402_2, \ldots 402_n$ may be coupled to the frame 404 at any position. Similarly, the frame 404 may be of any shape. In one example, the one or more sensors $402_1, 402_2, \ldots 402_n$ may be the same type of sensors (e.g., an accelerometer or a microphone); however, the one or more sensors $402_1, 402_2, \ldots 402_n$ may be any number and combination of types of sensors.

The information of the input signal may indicate a motion input to the surface of the touchpad device 400. Also, the one or more sensors $402_1, 402_2, \ldots 402_n$ may output a mechanical vibration signal indicative of a mechanical vibration propagating to the one or more sensors $402_1, 402_2, \ldots 402_n$ via the frame 404 due to contact with the surface during the motion.

The information of the input signal from the touchpad device 400 and the information of the one or more sensors $402_1, 402_2, \ldots 402_n$ may be of any combination of forms. In one example, the information of the input signal may be relative amounts of movement in two component directions with respect to a two-dimensional coordinate system (i.e., amount of movement in x-axis and y-axis component directions). Additionally, velocity or acceleration information may accompany the movement information. Other possible information of the input signal includes a number of objects (e.g., number of fingers or pointing devices) contacting a surface of the touchpad device 400 or an amount of pressure applied to the surface. Alternatively, the information of the input signal may be provided as absolute position and or movement information. In another example, the information of the input signal may be raw data generated by a grid array of capacitive sensors or other type of sensors used by the touchpad device 400. The information of the one or more sensors $402_1, 402_2, \ldots 402_n$ may similarly be raw vibration data, information of a characteristic of the vibration data, a mechanical vibration signal, or processed movement and/or position information. The touchpad device 400 and the one or more sensors $402_1, 402_2, \ldots 402_n$ may make use of available or external processing components and/or databases for processing the motion input to the signal as well as the mechanical vibrations resulting from contact with the surface during the motion.

At 406, the information of the input signal and the information of the one or more sensors $402_1, 402_2, \ldots 402_n$ may be processed to estimate state information 408. In one example, information associated with relative motion of the input to the surface of the touchpad device 400 may be determined. For example, varying intensities of one or more mechanical vibration signals may be used to determine the information associated with relative motion. Information of the input signal and the information associated with relative motion may be correlated and compared. In some examples, the information associated with relative motion and information of the input signal may include time stamps indicating when the information was received or generated. The information may be correlated based on the time stamps. In one example, a sensor may have an associated time delay used for correlating the information. The time delay may be associated with a propagation delay of a mechanical vibration to a position which the sensor is coupled to the frame 404 relative to the touchpad device 400.

In one example, information of the input signal and information associated with relative motion of the input to the surface received at substantially the same time as the motion input to the surface may be matched. A portion of the input signal from the information of the input signal may be removed, altered, or replaced if information of the portion varies with respect to the information associated with relative motion above a tolerance. In another example, information of the input signal and information associated with the relative motion may be combined using a weighted average. For example, movement and/or position information may be estimated based on a weighted average of movement and/or position information of the information of the input signal and the information associated with the relative motion.

Various sensor fusion algorithms may be employed to compensate for electrical noise within the input signal of the touchpad device. In some examples, by combining information from the one or more sensors with the input signal from the touchpad device, the resulting information may be more accurate, more complete, more dependable, etc., than when the one or more sensors or touchpad device were used individually. Possible sensor fusion algorithms or methods include Kalman filters or Bayesian networks, among other statistical or probabilistic techniques. For example, a Kalman filter produces estimates of true values of measurements and their associated calculated values by predicting a value, estimating the uncertainty of the predicted value, and computing a weighted average of the predicted value and the measured value.

In another example, a tap classifier may measure accelerations with respect to a z-axis (e.g., normal to a surface of the touchpad device). The accelerations may be correlated with a single high going and low going pulse. For example, the high going and low going pulses may correspond to the frame accelerating inward and then bouncing back outward on release of contact with the touchpad surface. The tap classifier may correlate the high going and low going pulses with measured accelerations with respect to the z-axis in time during a contact with the surface of the touchpad device. A high correlation may be indicative of a tap, while a lower correlation may be indicative of a tap not occurring. Information of the tap classifier may be further correlated with information of the input signal to determine whether or not to register a tap. For example, a tap may only be registered when the tap classifier and the information of the input signal agree.

In a further example, the touchpad device may be coupled to an extending side-arm (or any position on) a frame. The frame may resemble a traditional pair or eyeglasses with two extending side-arms, for example. An acceleration model may be developed for the frame, treating the frame as a weighted mass and applying appropriate spring constants computed for the extending side-arms. An acceleration profile resulting from contact with the touchpad device may be estimated for the frame and the extending side-arms. The acceleration profile may be compared against received mechanical vibration signals to determine whether the touchpad device is in operation when an input signal is received from the touchpad device. In some cases, the acceleration profile and received mechanical vibration signals may disagree. A determination may be made that the input signal may be the result of electrical noise adversely affecting the touchpad device.

Figure 5A:
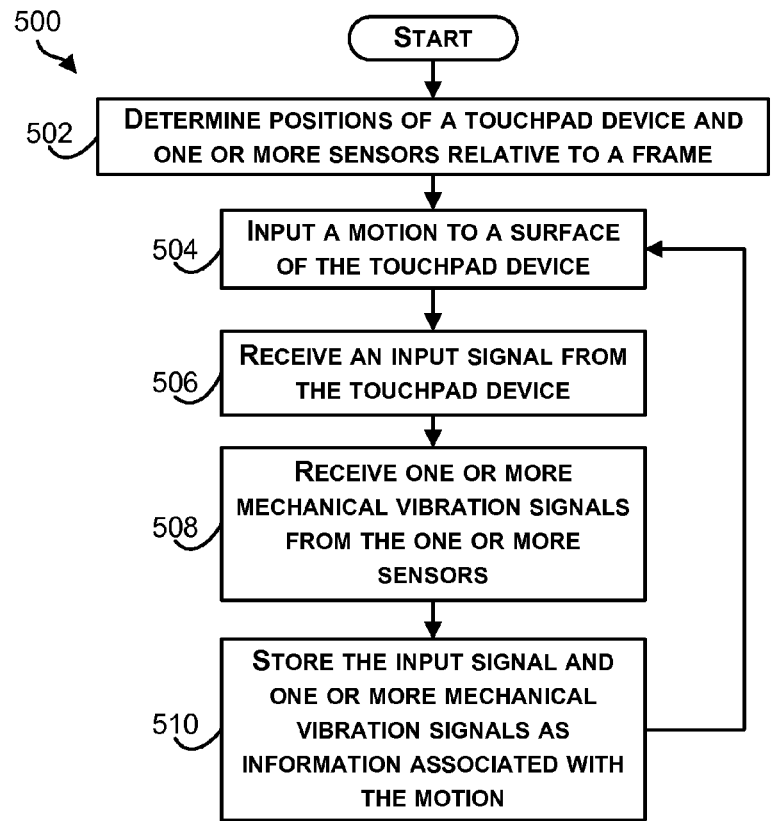
FIG. 5A illustrates an example block diagram of a method to generate a plurality of input signals and mechanical vibration signals.

FIG. 5A illustrates an example block diagram of a method 500 to generate a plurality of input signals and mechanical vibration signals. The method 500 shown in FIG. 5A presents an embodiment of a method that may, for example, be used by the system 100 of FIG. 1. Method 500 may include one or more operations, functions, or actions as illustrated by one or more of blocks 502-510. Although the blocks are illustrated in a sequential order, these blocks may also be performed in parallel, and/or in a different order than those described herein. Also, the various blocks may be combined into fewer blocks, divided into additional blocks, and/or removed from the method, based upon the desired implementation of the method. Each block may represent a module, a segment, or a portion of program code, which includes one or more instructions executable by a processor for implementing specific logical functions or steps in the process. In addition, each block in FIG. 5A may represent circuitry that is wired to perform the specific logical functions in the process.

Initially, at block 502, the method 500 includes determine positions of a touchpad device and one more or sensors relative to a frame. For example, the touchpad device and the one or more sensors may be coupled to known, fixed position on the frame. The position of the touchpad device may be determined with respect to a two-dimensional or three-dimensional coordinate system. Similarly, the position of the one or more sensors may be determined with respect to the same coordinate system. Optionally, distances may be determined between the touchpad device and the one or more sensors.

At block 504, the method 500 includes input a motion to a surface of the touchpad device. In one example, the input may occur while the touchpad device is not within a noisy electrical environment. The method 500 may be used as a calibration to associate the input with an input signal and one or more mechanical vibration signals. The motion may be, for example, a tap, or multiple taps, on a position of the surface or a sliding motion across the surface of the touchpad device or a combination of a tap and sliding motion. Additionally, the motion may be in a direction parallel or planar to the surface, in a direction normal to the surface, or both.

At block 506, the method 500 includes receive an input signal from the touchpad device. The touchpad device may output an input signal indicating the motion input to the surface of the touchpad device. The input signal may include information associated with position and/or movement information. In some examples, the input signal may be a raw data signal from a sensor of the touchpad device used to determine position and/or movement information.

At block 508, the method 500 includes receive one or more mechanical vibration signals from the one or more sensors. The one or more mechanical vibrations signals may result from a contact with the surface of the touchpad device during the motion. One or more mechanical vibrations may propagate from the contact with the surface to the one or more sensors via the frame.

At block 510, the method 500 includes store the input signal and one or more mechanical vibration signals as information associated with the motion. The information may be stored in a local database or a database within a server. Optionally, information associated with the positions of the touchpad device and the one or more sensors may be stored with the information. In one example, the motion input may be a gesture, and a user may identify the gesture. The identity of the gesture may be stored along with the information. In one example, the method 500 may be used to generate a plurality of input signals and mechanical vibration signals by inputting a plurality of motions to the surface of the touchpad device.

In one example, the method 500 may further include receiving a temperature signal from one or more sensors optionally coupled to the frame. Information associated with the temperature signal may also be stored with the mechanical vibration signals and information associated with the motion.

Figure 5B:
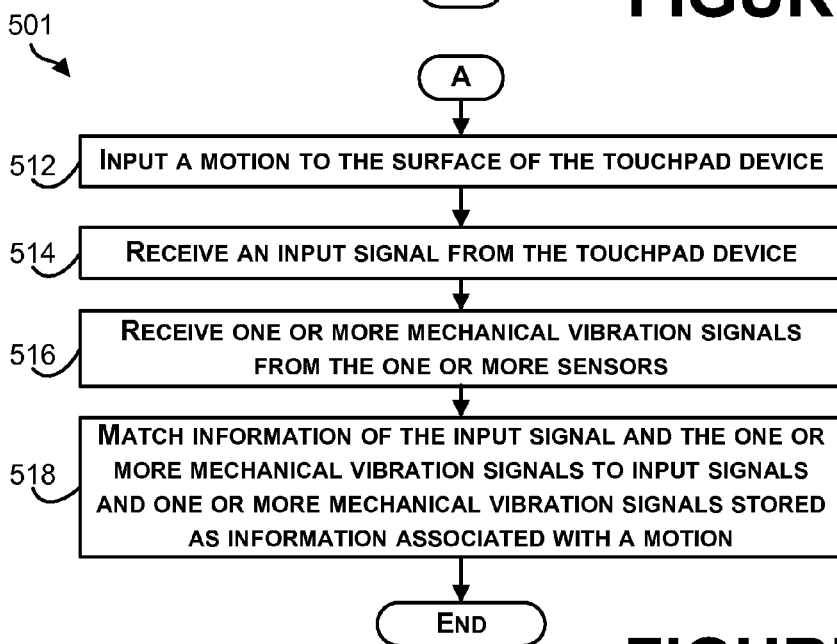
FIG. 5B illustrates an example block diagram of a method to determine position and/or movement information associated with a motion input to a touchpad device.

FIG. 5B illustrates an example block diagram of a method 501 to determine position and/or movement information associated with a motion input to a touchpad device. Method 501 may include one or more operations, functions, or actions as illustrated by one or more of blocks 512-518. Each block may represent a module, a segment, or a portion of program code, which includes one or more instructions executable by a processor for implementing specific logical functions or steps in the process. In addition, each block in FIG. 5B may represent circuitry that is wired to perform the specific logical functions in the process.

The method 501 shown in FIG. 5B presents an embodiment of a method that may, for example, be used in conjunction with the method 500 of FIG. 5A. For example, motions input to the touchpad device and corresponding input signals and mechanical vibration signals may be calibrated in a stable electrical environment according to the method 500 of FIG. 5A. The stable electrical environment may allow input signals to be generated by the touchpad device with substantially no electrical noise. Subsequently, the method 501 of FIG. 5B may occur at a later time within a noisy electrical environment.

Initially, at block 512, the method 501 includes input a motion to the surface of the touchpad device. At block 514, the method 501 includes receive an input signal from the touchpad device. At block 516, the method 501 includes receive one or more mechanical vibration signals from the one or more sensors.

At block 518, the method 501 includes match information of the input signal and the one or more mechanical vibration signals to input signals and one or more mechanical vibration signals stored as information associated with a motion. In one example, based on the matched motion, position and/or movement information associated with the motion input to surface of the touchpad device may be determined. In another example, the motion input to the surface of the touchpad device may be a gesture. The information of the input signal and the one or more mechanical vibration signals may be matched to information associated with the gesture.

In one example, the input signal may include electrical noise and may differ from stored input signals. However, the one or more mechanical vibration signals may match to one or more stored mechanical vibration signals. The stored input signal associated with the one or more matched mechanical vibration signals may be provided to a computing device in place of the noisy input signal. In another example, the input signal may match to a first portion of a stored input signal, but differ from the stored input signal in a second portion. Meanwhile, the one or more mechanical vibration signals may match (or closely match) to a stored association of one or more mechanical vibration signals. The stored input associated with the one or more matched mechanical vibration signals may be provided to a computing device in place of the input signal.

In another example, the method 501 may further include receiving from one or more sensors, optionally coupled to the frame, a temperature signal. The method 501 may also include using information of the temperature signal to match information of the input signal and the one or more mechanical vibration signals to input signals and one or more mechanical vibration signals stored as information associated with a motion. For example, information of the temperature signal may be compared to a baseline temperature. The baseline temperature may be a normal operating temperature of a touchpad device. In some examples, the comparison of information of the temperature signal with the baseline temperature may be an indication of an expected amount of electrical noise within the input signal from the touchpad device. For example, when a temperature determined from the temperature signal is greater than the baseline temperature, more electrical noise within the input signal may be expected. In other examples, the information of the temperature signal may be used as an additional factor matched to temperature information stored as information associated with a motion in a database.

Figure 6:
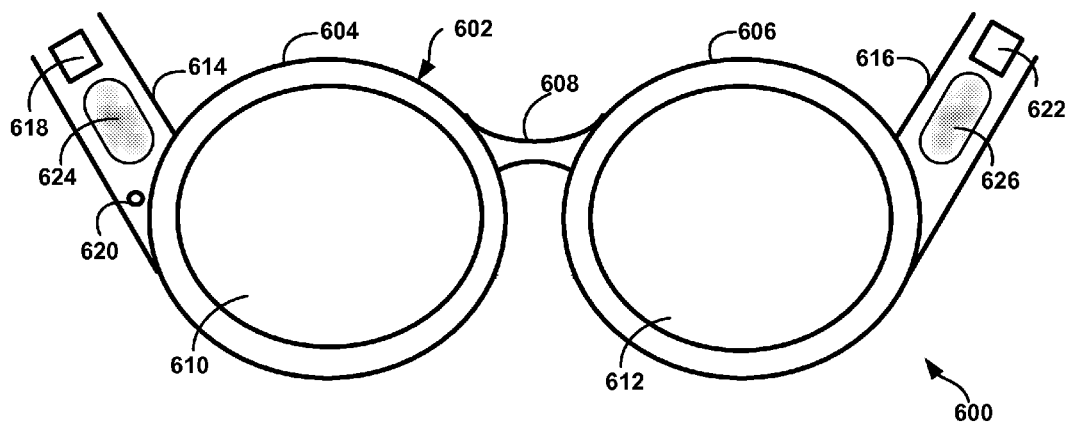
FIG. 6 illustrates an example system.

In one example, one or more of movement and position information associated with the motion input to the surface of the touchpad device may be provided to a computing device coupled to the frame. In one embodiment, the computing device may be a wearable computing device. FIG. 6 illustrates an example system 600. The system 600 is shown in the form of a wearable computing device. While FIG. 6 illustrates eyeglasses 602 as an example of a wearable computing device, other types of wearable computing devices could additionally or alternatively be used. As illustrated in FIG. 6, the eyeglasses 602 comprise frame elements including lens-frames 604 and 606 and a center frame support 608, lens elements 610 and 612, and extending side-arms 614 and 616. The center frame support 608 and the extending side-arms 614 and 616 are configured to secure the eyeglasses 602 to a user's face via a user's nose and ears, respectively. Each of the frame elements 604, 606, and 608 and the extending side-arms 614 and 616 may be formed of a solid structure of plastic or metal, or may be formed of a hollow structure of similar material so as to allow wiring and component interconnects to be internally routed through the eyeglasses 602. Each of the lens elements 610 and 612 may be formed of a material configured to display a projected image or graphic. Each of the lens elements 610 and 612 may also be sufficiently transparent to allow a user to see through the lens element. In one example, combining these two features of the lens elements 610 and 612 can facilitate an augmented reality or heads-up display where a projected image or graphic may be superimposed over a real-world view as perceived by the user through the lens elements 610 and 612.

The extending side-arms 614 and 616 are each projections that extend away from the frame elements 604 and 606, respectively, and are positioned behind a user's ears to secure the eyeglasses 602 to the user. The extending side-arms 614 and 616 may further secure the eyeglasses 602 to the user by extending around a rear portion of the user's head. Additionally or alternatively, for example, the system 600 may connect to or be affixed within a head-mounted helmet structure. Other possibilities exist as well.

Although the system 600 is illustrated as traditional eyeglasses 602, the system 600 and term eyeglasses 602 may also describe a wearable computing device in the form of a monocular device (not shown). For example, the system 600 may be a modular device comprising a single lens element which may be coupled to a head-mounted structure. In one example, the system 600 may not include the lens-frames 604, 606 and lens elements 610, 612. The modular device may be coupled to one of the extending side-arms 614, 616 or the center frame support 608. For example, the center frame support 608 may connect the extending side-arms 614, 616.

In one example, the modular device may be coupled to an inner side (i.e., a side exposed to a portion of a user's head when worn by the user) of an extending side-arm 114. A frame or support of the modular device may allow the single lens element to be positioned in front of or proximate to a user's eye when the head-mounted structure is worn by a user. For example, the single lens element may be positioned below the center frame support 608 which may be connecting the extending side-arms 614, 616. In another example, the single lens element may be provided adjacent to or over one of the lens elements 610, 612. Thus, the term eyeglasses 602 may be broadly defined to include a head-mounted device comprising a frame and at least one lens element.

The system 600 may also include an on-board computing system 618, a video camera 620, a sensor 622, and finger-operable touchpad devices 624, 626. The on-board computing system 618 is shown to be positioned on the extending side-arm 614 of the eyeglasses 602; however, the on-board computing system 618 may be provided on other parts of the eyeglasses 602. The on-board computing system 618 may include a processor and memory, for example. The on-board computing system 618 may be configured to receive and analyze data from the video camera 620 and the finger-operable touchpad devices 624, 626 (and possibly from other sensory devices, user interfaces, or both) and generate images for output to the lens elements 610 and 612.

The video camera 620 is shown to be positioned on the extending side-arm 614 of the eyeglasses 602; however, the video camera 620 may be provided on other parts of the eyeglasses 602. The video camera 620 may be configured to capture images at various resolutions or at different frame rates. Many video cameras with a small form-factor, such as those used in cell phones or webcams, for example, may be incorporated into an example of the system 600. Although FIG. 6 illustrates one video camera 620, more video cameras may be used, and each may be configured to capture the same view, or to capture different views. For example, the video camera 620 may be forward facing to capture at least a portion of the real-world view perceived by the user. This forward facing image captured by the video camera 620 may then be used to generate an augmented reality where computer generated images appear to interact with the real-world view perceived by the user.

The sensor 622 is shown mounted on the extending side-arm 616 of the eyeglasses 602; however, the sensor 622 may be provided on other parts of the eyeglasses 602. The sensor 622 may include one or more of a gyroscope or an accelerometer, for example. Other sensing devices may be included within the sensor 622 or other sensing functions may be performed by the sensor 622.

The finger-operable touchpad devices 624, 626 are shown mounted on the extending side-arms 614, 616 of the eyeglasses 602. Each of finger-operable touchpad devices 624, 626 may be used by a user to input commands. The finger-operable touchpad devices 624, 626 may sense at least one of a position and a movement of a finger via capacitive sensing, resistance sensing, or a surface acoustic wave process, among other possibilities. The finger-operable touchpad devices 624, 626 may be capable of sensing finger movement in a direction parallel or planar to the pad surface, in a direction normal to the pad surface, or both, and may also be capable of sensing a level of pressure applied. The finger-operable touchpad devices 624, 626 may be capable of sensing finger movement or movement of an object with or without contact to the touchpad devices 624,626. For example, the touchpad devices 624,626 may be capable of proximity detection. The finger-operable touchpad devices 624, 626 may be formed of one or more translucent or transparent insulating layers and one or more translucent or transparent conducting layers. Edges of the finger-operable touchpad devices 624, 626 may be formed to have a raised, indented, or roughened surface, so as to provide tactile feedback to a user when the user's finger reaches the edge of the finger-operable touchpad devices 624, 626. Each of the finger-operable touchpad devices 624, 626 may be operated independently, and may provide a different function. The finger-operable touchpad devices 624, 626 may control a cursor on a display on the lens elements 610, 612.

Figure 7:
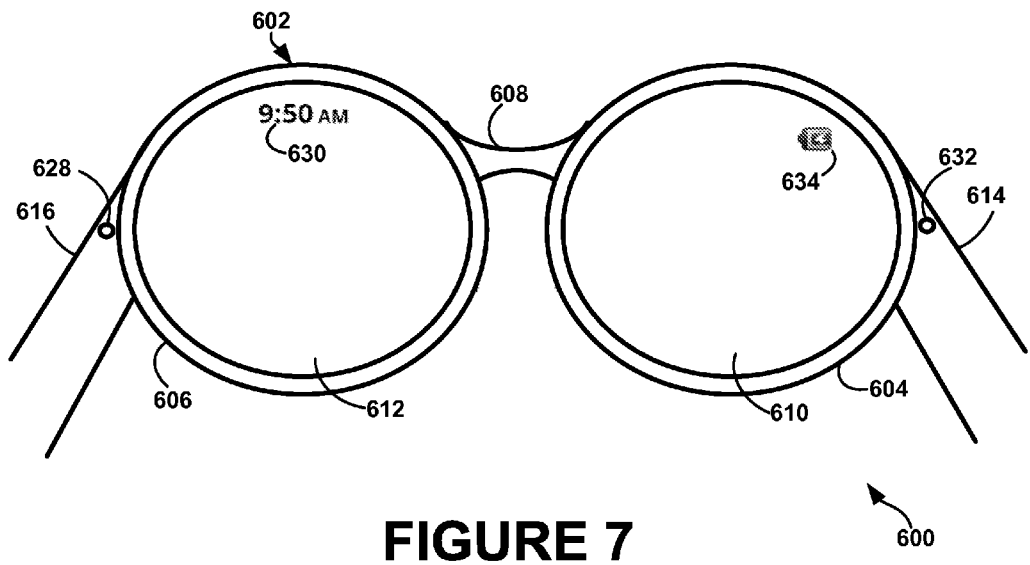
FIG. 7 illustrates an alternate view of the system of FIG. 6.

FIG. 7 illustrates an alternate view of the system 600 of FIG. 6. As shown in FIG. 6, the lens elements 610 and 612 may act as display elements. The eyeglasses 602 may include a first projector 628 coupled to an inside surface of the extending side-arm 616 and configured to project a display 630 onto an inside surface of the lens element 612. Additionally or alternatively, a second projector 632 may be coupled to an inside surface of the extending side-arm 614 and may be configured to project a display 634 onto an inside surface of the lens element 610.

The lens elements 610 and 612 may act as a combiner in a light projection system and may include a coating that reflects the light projected onto the lens elements 610 and 612 from the projectors 628 and 632. In some embodiments, a special coating may not be used (e.g., when the projectors 628 and 632 are scanning laser devices).

In alternative embodiments, other types of display elements may also be used. For example, the lens elements 610, 612 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 604 and 606 for driving such a matrix display. Alternatively or additionally, a laser or LED source and scanning system could be used to draw a raster display directly onto the retina of one or more of the user's eyes. Other possibilities exist as well.

Figure 8:
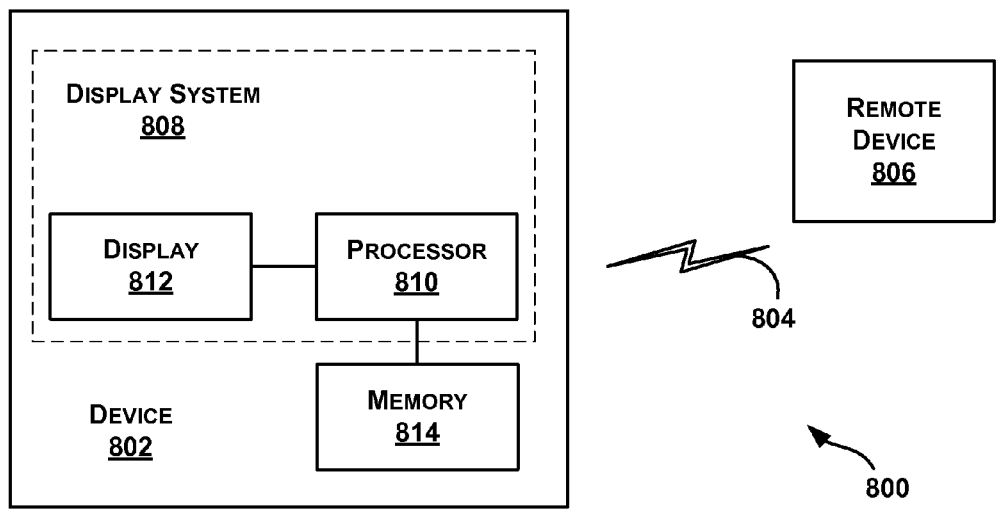
FIG. 8 illustrates an example schematic figure of a computer network infrastructure in which a wearable computing device may operate.

Referring now to FIG. 8, an example schematic figure of a computer network infrastructure 800 is illustrated, in which a wearable computing device may operate. The computer network infrastructure 800 includes a device 802 configured to communicate using a communication link 804 (e.g., a wired or wireless connection) to a remote device 806. The device 802 may be any type of device that can receive data and display information corresponding to or associated with the data. For example, the device 802 may be a heads-up display system, such as the eyeglasses 602 described with reference to FIGS. 6 and 7.

Thus, the device 802 may include a display system 808 comprising a processor 810 and a display 812. The display 812 may be, for example, an optical see-through display, an optical see-around display, or a video see-through display. The processor 810 may receive data from the remote device 806, and configure the data for display on the display 812. The processor 810 may be any type of processor, such as a microprocessor or a digital signal processor, for example.

The device 802 may further include on-board data storage, such as memory 814, coupled to the processor 810. The memory 814 may store software that can be accessed and executed by the processor 810, for example.

The remote device 806 may be any type of computing device or transmitter including a laptop computer, a mobile telephone, etc., that is configured to transmit data to the device 802. The remote device 806 and the device 802 may contain hardware to enable the communication link 804, such as processors, transmitters, receivers, antennas, etc.

In FIG. 8, the communication link 804 is illustrated as a wireless connection. The wireless connection may include using, for example, Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. Wired connections may also be used. For example, the communication link 804 may be a wired link via a serial bus such as a universal serial bus or a parallel bus. A wired connection may be a proprietary connection as well. The remote device 806 may be accessible, using wired or wireless links, via the Internet and may comprise a computing cluster associated with a particular web service (e.g., social-networking, photo sharing, address book, etc.).

Figure 9:
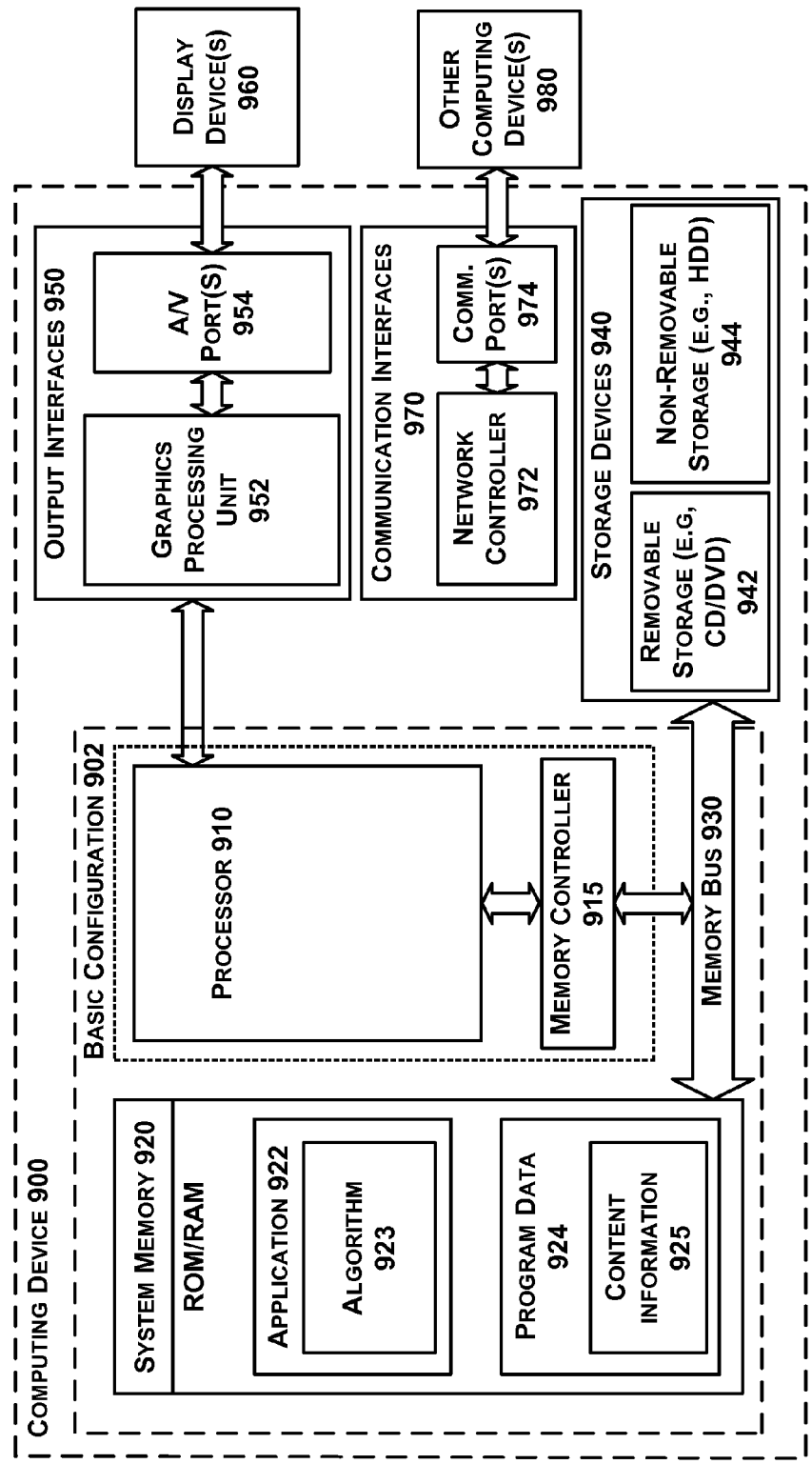
FIG. 9 is a functional block diagram illustrating an example computing device used in a computing system that is arranged in accordance with at least some embodiments described herein.

FIG. 9 is a functional block diagram illustrating an example computing device 900 used in a computing system that is arranged in accordance with at least some embodiments described herein. The computing device may be a personal computer, mobile device, cellular phone, touch-sensitive wristwatch, tablet computer, video game system, or global positioning system, and may be implemented as a wearable computing device as described in FIGS. 1-8. In a basic configuration 902, computing device 900 may typically include one or more processors 910 and system memory 920. A memory bus 930 can be used for communicating between the processor 910 and the system memory 920. Depending on the desired configuration, processor 910 can be of any type including but not limited to a microprocessor (µP), a microcontroller (µC), a digital signal processor (DSP), or any combination thereof. A memory controller 915 can also be used with the processor 910, or in some implementations, the memory controller 915 can be an internal part of the processor 910.

Depending on the desired configuration, the system memory 920 can be of any type including but not limited to volatile memory (such as RAM), non-volatile memory (such as ROM, flash memory, etc.) or any combination thereof.

System memory 920 may include one or more applications 922, and program data 924. Application 922 may include an algorithm 923 that is arranged to provide inputs to the electronic circuits, in accordance with the present disclosure. Program data 924 may include content information 925 that could be directed to any number of types of data. In some example embodiments, application 922 can be arranged to operate with program data 924 on an operating system.

Computing device 900 can have additional features or functionality, and additional interfaces to facilitate communications between the basic configuration 902 and any devices and interfaces. For example, data storage devices 940 can be provided including removable storage devices 942, non-removable storage devices 944, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 920 and storage devices 940 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media can be part of device 900.

Computing device 900 can also include output interfaces 950 that may include a graphics processing unit 952, which can be configured to communicate to various external devices such as display devices 960 or speakers via one or more A/V ports or a communication interface 970. The communication interface 970 may include a network controller 972, which can be arranged to facilitate communications with one or more other computing devices 980 over a network communication via one or more communication ports 974. The communication connection is one example of a communication media. Communication media may be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 900 can be implemented as a portion of a small-form factor portable (or mobile) electronic device such as a cell phone, a personal data assistant (PDA), a personal media player device, a wireless web-watch device, a personal headset device, a head-mounted display device, an application specific device, or a hybrid device that include any of the above functions. Computing device 900 can also be implemented as a personal computer including both laptop computer and non-laptop computer configurations.

Figure 10:
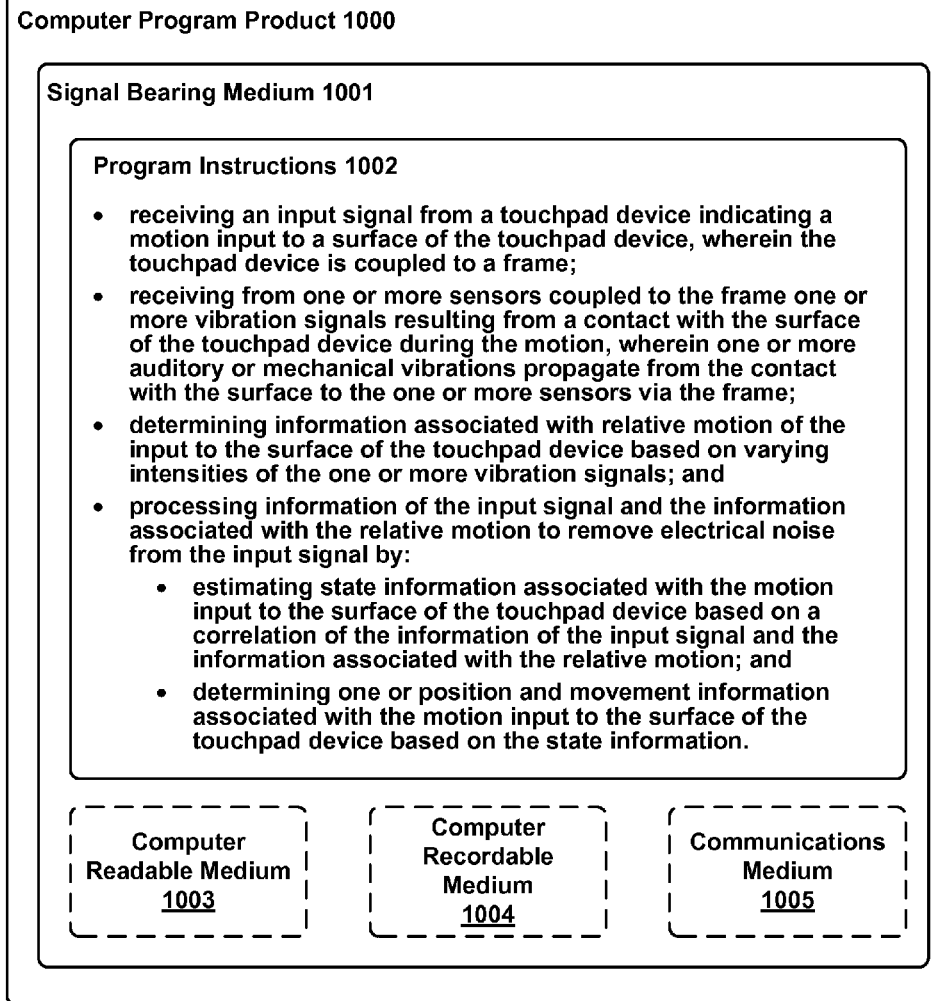
FIG. 10 is a schematic illustrating a conceptual partial view of an example computer program product that includes a computer program for executing a computer process on a computing device, arranged according to at least some embodiments presented herein.

In some embodiments, the disclosed methods may be implemented as computer program instructions encoded on a non-transitory computer-readable storage media in a machine-readable format, or on other non-transitory media or articles of manufacture. FIG. 10 is a schematic illustrating a conceptual partial view of an example computer program product 1000 that includes a computer program for executing a computer process on a computing device, arranged according to at least some embodiments presented herein. In one embodiment, the example computer program product 1000 is provided using a signal bearing medium 1001. The signal bearing medium 1001 may include one or more programming instructions 1002 that, when executed by one or more processors may provide functionality or portions of the functionality described above with respect to FIGS. 1-9. Thus, for example, referring to the embodiments shown in FIG. 2, one or more features of blocks 201-207 may be undertaken by one or more instructions associated with the signal bearing medium 1001.

In some examples, the signal bearing medium 1001 may encompass a computer-readable medium 1003, such as, but not limited to, a hard disk drive, a Compact Disc (CD), a Digital Video Disk (DVD), a digital tape, memory, etc. In some implementations, the signal bearing medium 1001 may encompass a computer recordable medium 1004, such as, but not limited to, memory, read/write (R/W) CDs, R/W DVDs, etc. In some implementations, the signal bearing medium 1001 may encompass a communications medium 1005, such as, but not limited to, a digital and/or an analog communication medium (e.g., a fiber optic cable, a waveguide, a wired communications link, a wireless communication link, etc.). Thus, for example, the signal bearing medium 1001 may be conveyed by a wireless form of the communications medium 1005 (e.g., a wireless communications medium conforming with the IEEE 802.11 standard or other transmission protocol).

The one or more programming instructions 1002 may be, for example, computer executable and/or logic implemented instructions. In some examples, a computing device such as the computing device 900 of FIG. 9 may be configured to provide various operations, functions, or actions in response to the programming instructions 1002 conveyed to the computing device 900 by one or more of the computer readable medium 1003, the computer recordable medium 1004, and/or the communications medium 1005.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   receiving an input signal from a touchpad device indicating a motion that is input to a surface of the touchpad device, wherein the touchpad device is a capacitive touchpad device that is coupled to a frame, and wherein the input signal includes information indicative of the motion input to the surface of the touchpad device being a sliding motion across the surface of the touchpad device;

receiving from one or more sensors coupled to the frame one or more vibration signals resulting from a contact with the surface of the touchpad device during the motion, wherein one or more auditory or mechanical vibrations propagate from the contact with the surface to the one or more sensors via the frame;

determining information associated with relative motion of the motion that is input to the surface of the touchpad device based on varying intensities of the one or more vibration signals, wherein relative motion indicates movement with respect to a known position of the one or more sensors; and processing information of the input signal and the information associated with the relative motion to compensate for electrical noise in the input signal by:

estimating state information associated with the motion that is input to the surface of the touchpad device based on a correlation of the information of the input signal and the information associated with the relative motion;

determining one of position and movement information associated with the motion that is input to the surface of the touchpad device based on the state information; and providing a modified input signal as a substitute for the input signal, wherein a portion of the information of the input signal is modified based on the one of position and movement information.

2. The method of claim 1, further comprising:
the one or more sensors receiving the one or more auditory or mechanical vibrations; and
the one or more sensors outputting the one or more vibration signals being indicative of the contact with the surface of the touchpad device during the motion.

3. The method of claim 1, wherein determining information associated with relative motion of the motion that is input to the surface of the touchpad device based on varying intensities of the one more vibration signals comprises accessing a database to associate the varying intensities of the one or more vibration signals with a known motion.

4. The method of claim 1, wherein the touchpad device is operated in a noisy electrical environment, wherein an electrical circuit of the touchpad is disturbed by electromagnetic interference resulting in electrical noise within the input signal.

5. The method of claim 1, wherein the one or more sensors comprise a microphone coupled to a known position on the frame, and the method further comprising determining relative motion of the motion that is input to the surface of the touchpad device based on varying intensities of the vibration signal from the microphone.

6. The method of claim 5, wherein the one or more sensors comprise a second microphone coupled to a second known position, and the method further comprising determining two-dimensional position and movement of the motion that is input to the surface of the touchpad device based on outputs from the microphone and the second microphone.

7. The method of claim 1, wherein the one or more sensors comprise an accelerometer coupled to a known position on the frame, and the method further comprising determining relative motion of the motion that is input to the surface of the touchpad device based on varying intensities of the vibration signal from the accelerometer.

8. The method of claim 1, wherein the contact with the surface comprises a gesture on the surface.

9. The method of claim 1, further comprising accessing a database to determine whether the state information is associated with a known gesture.

10. The method of claim 1, further comprising:
determining a position of the touchpad device and the one or more sensors relative to the frame;
generating a plurality of input signals and vibration signals by inputting a plurality of motions to the surface of the touchpad;
matching the information of the input signal and one or more vibration signals to one of the generated input signals and vibration signals to determine one of position and movement information associated with the motion that is input to the surface of the touchpad device.

11. A non-transitory computer readable medium having stored therein instructions executable by a computing device to cause the computing device to perform functions comprising:

receiving an input signal from a touchpad device indicating a motion that is input to a surface of the touchpad device, wherein the touchpad device is a capacitive touchpad device that is coupled to a frame, and wherein the input signal includes information indicative of the motion input to the surface of the touchpad device being a sliding motion across the surface of the touchpad device;

receiving from one or more sensors coupled to the frame one or more vibration signals resulting from a contact with the surface of the touchpad device during the motion, wherein one or more auditory or mechanical vibrations propagate from the contact with the surface to the one or more sensors via the frame;

determining information associated with relative motion of the motion that is input to the surface of the touchpad device based on varying intensities of the one or more vibration signals, wherein relative motion indicates movement with respect to a known position of the one or more sensors; and processing information of the input signal and the information associated with the relative motion to compensate for electrical noise in the input signal by:

estimating state information associated with the motion that is input to the surface of the touchpad device based on a correlation of the information of the input signal and the information associated with the relative motion;

determining one of position and movement information associated with the motion that is input to the surface of the touchpad device based on the state information; and providing a modified input signal as a substitute for the input signal, wherein a portion of the information of the input signal is modified based on the one of position and movement information.

12. The computer readable medium of claim 11, further comprising instructions executable for:
the one or more sensors receiving the one or more auditory or mechanical vibrations; and
the one or more sensors outputting the one or more vibration signals being indicative of the contact with the surface of the touchpad device during the motion.

13. A system comprising:
a memory;
a processor coupled to the memory; and
instructions stored in the memory and executable by the processor to perform functions comprising:

receiving an input signal from a touchpad device indicating a motion that is input to a surface of the touchpad device, wherein the touchpad device is a capacitive touchpad device that is coupled to a frame, and wherein the input signal includes information indicative of the motion input to the surface of the touchpad device being a sliding motion across the surface of the touchpad device;

receiving from one or more sensors coupled to the frame one or more vibration signals resulting from a contact with the surface of the touchpad device during the motion, wherein one or more auditory or mechanical vibrations propagate from the contact with the surface to the one or more sensors via the frame;

determining information associated with relative motion of the motion that is input to the surface of the touchpad device based on varying intensities of the one or more vibration signals, wherein relative motion indicates movement with respect to a known position of the one or more sensors; and processing information of the input signal and the information associated with the relative motion to compensate for electrical noise in the input signal by:

estimating state information associated with the motion input to the surface of the touchpad device based on a correlation of the information of the input signal and the information associated with the relative motion;

determining one of position and movement information associated with the motion that is input to the surface of the touchpad device based on the state information; and providing a modified input signal as a substitute for the input signal, wherein a portion of the information of the input signal is modified based on the one of position and movement information.

14. The system of claim 13, further comprising instructions for providing the modified input signal to a computing device coupled to the frame.

15. The system of claim 14, wherein the computing device includes a wearable computing device.

16. The system of claim 15, wherein the computing device includes a head-mounted display device and the frame includes a frame of a pair of glasses.

17. The system of claim 13, wherein providing a modified input signal comprises:

matching the information of the input signal with the information associated with relative motion in time based on varying intensities of the one or more vibration signals received at substantially the same time as the motion that is input to the surface of the touchpad device;

modifying a portion of the information of the input signal associated with an instance in time where the variation of the portion of the information of the input signal with respect to the matching information associated with relative motion is above a tolerance using the matching information associated with relative motion so as to provide a modified input signal; and determining state information associated with the motion that is input to the surface of the touchpad device based on the modified input signal.

18. The system of claim 13, wherein estimating state information associated with the motion that is input to the surface of the touchpad device based on a correlation of the information of the input signal and the information associated with the relative motion comprises:

determining a first uncertainty value of the information of the input signal;

determining a second uncertainty value of the information associated with the relative motion;

processing information of the input signal and information associated with the relative motion using a weighted average, wherein a weight of the information of the input signal is the first uncertainty value and a weight of the information associated with the relative motion is a second uncertainty value; and determining state information associated with the motion that is input to the surface of the touchpad device based on the weighted average.

19. The system of claim 18, wherein the first uncertainty value and second uncertainty value are covariance values associated with one or more relationships between information of the input signal and information associated with the relative motion.

20. The system of claim 13, wherein the one or more sensors are separate and distinct from the touchpad device used to generate the input signal.

* * * * *